April 14, 1970   R. B. COOK   3,506,523
MACHINE FOR FORMING BAGS FROM THERMOPLASTIC TUBING
Filed Feb. 27, 1967   4 Sheets-Sheet 1
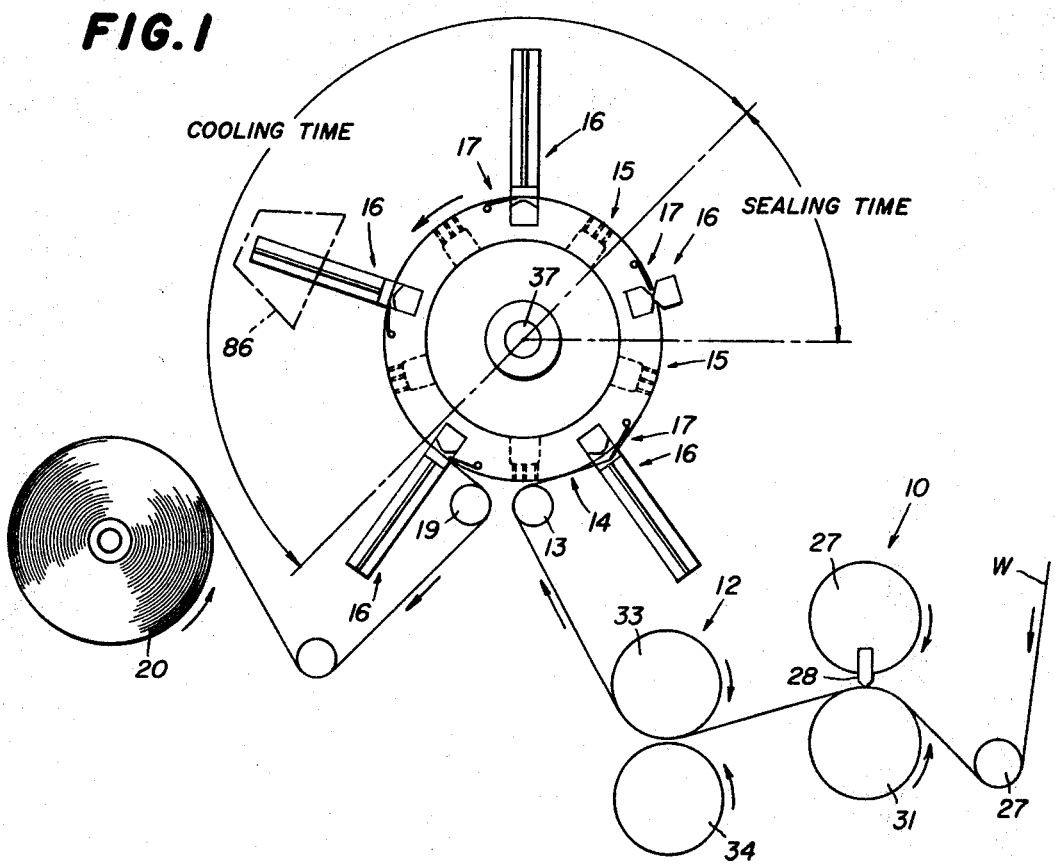
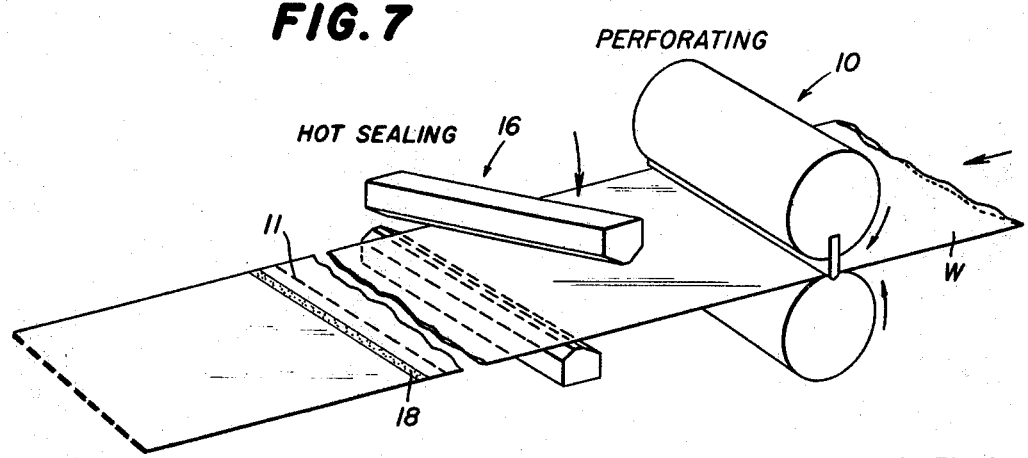
INVENTOR
ROY B. COOK
BY
ATTYS.

April 14, 1970     R. B. COOK     3,506,523

MACHINE FOR FORMING BAGS FROM THERMOPLASTIC TUBING

Filed Feb. 27, 1967     4 Sheets-Sheet 3

April 14, 1970     R. B. COOK     3,506,523
MACHINE FOR FORMING BAGS FROM THERMOPLASTIC TUBING
Filed Feb. 27, 1967     4 Sheets-Sheet 4

United States Patent Office 3,506,523
Patented Apr. 14, 1970

3,506,523
MACHINE FOR FORMING BAGS FROM
THERMOPLASTIC TUBING
Roy B. Cook, Newark, Ohio, assignor to Continental
Can Company, Inc., New York, N.Y., a corporation
of New York
Filed Feb. 27, 1967, Ser. No. 618,703
Int. Cl. B12l 31/08
U.S. Cl. 156—436                                                        16 Claims

ABSTRACT OF THE DISCLOSURE

A bag fabricating method and machine which is characterized by a rotatably mounted drum for supporting a plastic tubing in flattened continuous web form and having vacuum means for gripping the web at points spaced circumferentially about the drum, with transverse sealing members and associated members for shifting a portion of the web between the gripping points so as to provide web areas which are free of tension and in which transverse seals are formed and for subsequently holding the sealed areas away from the sealing members while advancing through a cooling zone after which the sealed web is delivered from the drum.

---

This invention relates to bag making, and is more particularly concerned with a method and a machine for transversely perforating and sealing a flattened tube of thermoplastic film material so as to divide the same into a connected series of bags which may be subsequently torn apart for use.

Machinery has been provided heretofore for producing successive flattened containers from thermoplastic films or like materials by heat sealing a flattened thermoplastic tube along spaced transverse lines while the flattened tube is advanced through the machine. In producing bags in this manner difficulty has been encountered in providing a method and a machine which will produce a satisfactory liquid-tight seal. It has been determined that in order to produce seals of required strength and quality for holding certain products, such as liquids, it is necessary to relax the web tension before hot sealing bars make contact with the web and also the web must be held in relaxed state after sealing until the seals are at least partially cool in order to prevent weakening the seal by stretching the material while it is hot. A general object of the present invention is to provide a method and a machine for applying transverse seals at predetermined spaced intervals to a flattened thermoplastic web, with the feed of the web controlled so that the material in the sealing area is fully relaxed and free from longitudinal tension while the seal is effected and for a period thereafter while the seals are cooled.

It is a more specific object of the invention to provide a novel method and apparatus for dividing a flattened thermoplastic tube into a plurality of bag forming sections wherein the tube is supported and gripped at longitudinal spaced intervals and there is provided means for applying transverse seals between the spaced gripping points and associated devices for moving a portion of each bag section laterally of the path of advance thereof after it is gripped at the leading end and before it is gripped at the trailing end of the section so as to insure that the portion in which the seal is formed is fully relaxed and free of any longitudinal tension.

It is a further object of the invention to provide a method and machine for fabricating bags from a continuous tube of flattened theromplastic film material wherein the tubular material is fed to a rotating drum which is provided with circumferentially spaced, tube gripping means and alternately spaced transverse sealing means, with the sealing means having an associated web engaging member adjacent the same which operates to move a portion of the web in a radial direction after a leading end is engaged by a gripping means on the drum and before the next succeeding gripping means is effective on the web so as to provide a length of web between each gripping means and the next succeeding gripping means which is greater than the circumferential distance between the gripping means thereby providing a fully relaxed bag section for application of a transverse seal and subsequent cooling of the seal while the material is in the relaxed condition.

Another object of the invention is to provide an improved machine for applying longitudinally spaced, transverse seals to a continuous tube of flattened thermoplastic film material so as to divide the tube into a series of bag forming sections which machine operates efficiently at a relatviely high rate of speed, which produces a seal of greater strength than normally required, which is adapted to receive tubular stock supplied either directly from a former, such as a plastic extruder, or from storage reels, which requires little adjustment and which is of relatively simple construction so that it may be built at a lower cost than machines heretofore provided for this purpose.

These and other objects and advantages of the invention will be apparent from a consideration of the method and machine which are shown by way of illustration in the accompanying drawings wherein:

FIGURE 1 is an elevational view illustrating schematically the sequence of operations performed in fabricating bags from a continuous flattened tube of thermoplastic film material in accordance with the method of this invention;

FIGURE 7 is a schematic perspective lineal view illustrating the operations performed on the tubular stock and the resulting bag structures.

Figure 2:
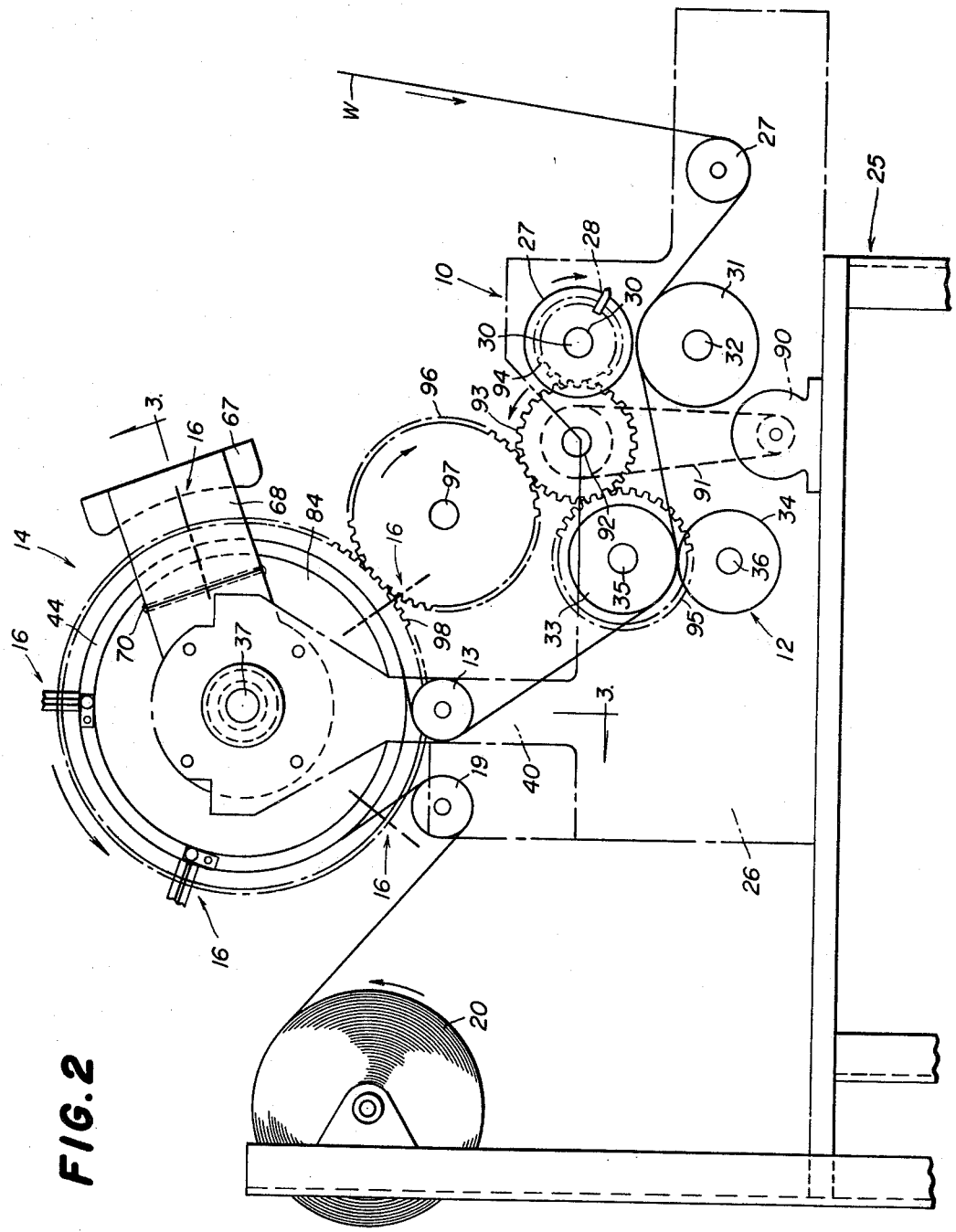
FIGURE 2 is a side elevational view of a bag forming machine constructed according to the present invention, the view being partially schematic and with portions omitted or broken away.

Referring first to FIGURES 1 and 7, the stock material from which the bags are fabricated is in the form of an endless web W of relatively flexible, flattened, heat sealable tubular material. The web W may be provided directly from a plastic extruder in the form of a flattened seamless tube. It may, however, be supplied from rolls previously produced by more than one extruder and stored prior to use on the present machine. The stock material, or flattened tube, is preferably a transparent film of cellophane, Pliofilm, or like thermoplastic film material which may be heat sealed. While the present machine is especially designed so that it will accept stock material directly from an extruder, it may also be employed to fabricate bags from a web of sheet material which has been longitudinally folded and sealed to provide a flattened tube.

The tubular web W is first passed through a perforating unit indicated at 10 in FIGURE 1 which applies lines of transverse perforations 11 at intervals corresponding to the length of the bag desired so that the finished bags may be readily separated from the web. The web then passes through a pair of draw rolls indicated at 12 and around a guide roll 13 onto a supporting drum or cylindrical turret 14. The periphery of the drum 14 is supplied with a series of circumferentially spaced vacuum ports 15 which are operated to grip and hold the web on the surface of the drum. A transverse sealing bar mechanism 16 is arranged on the drum 14 between each pair of adjacent vacuum ports 15 and associated with each sealing bar mechanism 16 is a web engaging or lifting mechanism, indicated at 17, which is operative to engage the inner face of the web material and lift a portion of it in a radial direction when the web is initially applied to the drum 14 with the result that a length of the web material is held on the drum between each vacuum port 15 and the next succeeding vacuum port 15 which is sufficient to relieve any longitudinal tension in the web, when the web is released by the mechanism 17, and thereby enabling a seal 18 to be formed while the material is completely relaxed. The sealed area is subsequently pulled away from the sealing bar and held out of contact with the same by operation of the mechanism 17 while it is passing through a cooling area. Finally, the sealed web is stripped from the drum 14 at the guide roll 19 and wound on a collecting reel 20.

Figure 3:
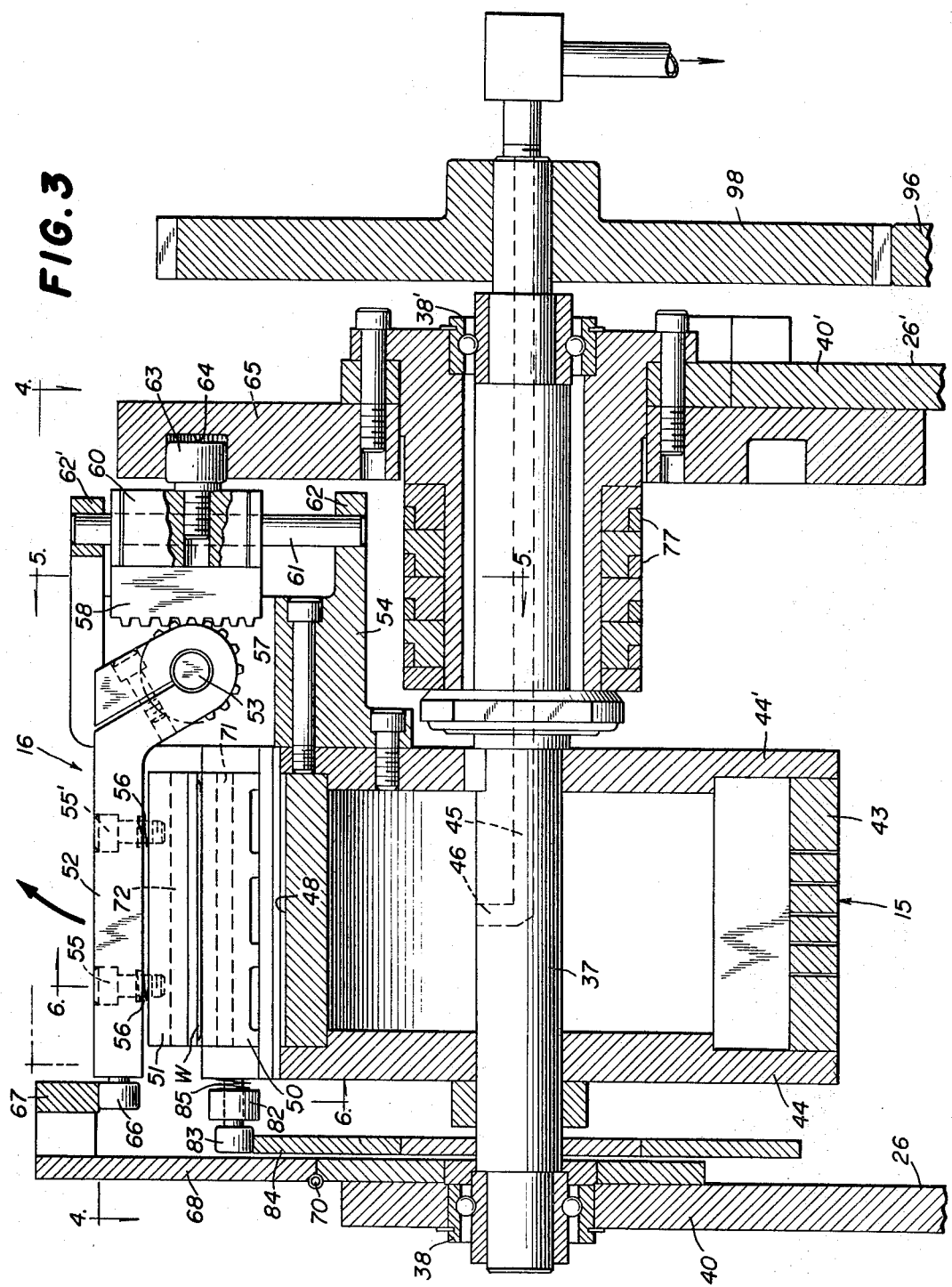
FIGURE 3 is a cross section taken on the line 3—3 of FIGURE 2, to an enlarged scale.
Figure 4:
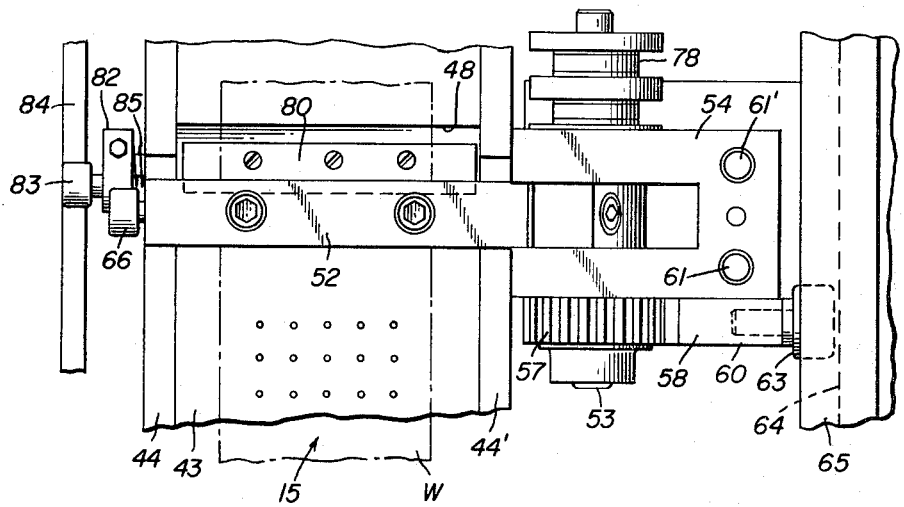
FIGURE 4 is a fragmentary view taken on the line 4—4 of FIGURE 3 and showing the mechanism at one of the seal forming stations on the web supporting drum.
Figure 5:
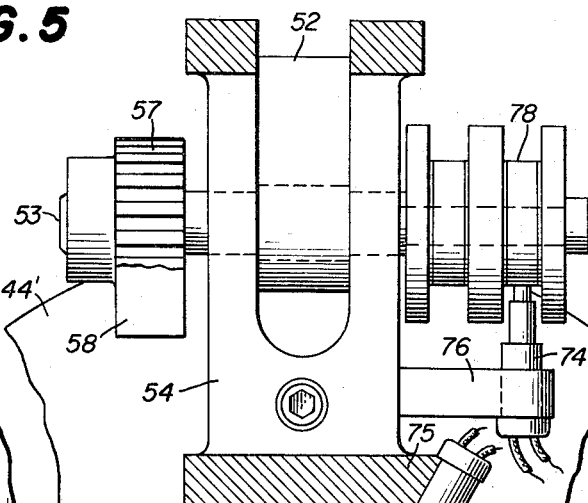
FIGURE 5 is a fragmentary sectional view taken on the line 5—5 of FIGURE 3.

The web supporting drum 14 and associated apparatus is mounted on an upright supporting frame 25 as shown in FIGURE 2. Side frame members 26 and 26' (FIGURE 3) support a perforating mechanism indicated at 10, draw rolls or pull rolls 12, and a guide roll 13. The perforating mechanism 10 comprises an upper perforator roll 27 having a perforating bar 28 and mounted on a cross shaft 30 which is journaled in suitable end bearings in the side frames 26 and 26'. An anvil roller 31 which co-operates with the perforating bar 28 is supported on a cross shaft 32, journaled at its ends in the side frames 26 and 26' so that the bar 28 applies longitudinally spaced, transverse lines of perforations 11, the spacing corresponding to the length of bag desired. The pull rolls 12 for advancing the web W comprise upper and lower rolls 33 and 34 which are mounted on cross shafts 35 and 36 journaled in suitable bearings in the side frame members 26 and 26'.

The drum assembly 14 is mounted on a cross shaft 37 which is journaled in the bearings 38 and 38' at the upper ends of upstanding frame side members 40 and 40'. The web is guided onto the drum assembly 14 by guide rollers 13 on a supporting shaft which is suitably journaled in the side frame members 26 and 26'.

Figure 6:
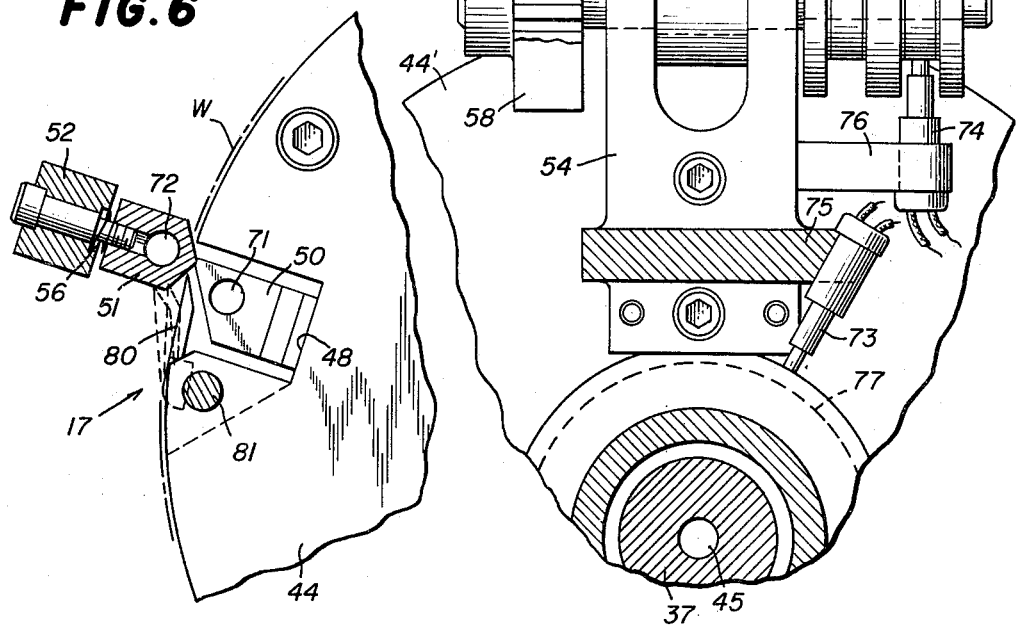
FIGURE 6 is a fragmentary elevation taken on the line 6—6 of FIGURE 3.

The drum assembly 14 (FIGURES 2 and 3) comprises a cylindrical body or core member 43 and front and back side plates 44 and 44' which support the body member 43 on the shaft 37. The drum supporting shaft 37 has axial and radial passageways 45 and 46 which connect the interior of the drum with a suitable vacuum pump or other source of vacuum. The vacuum ports 15 which extend through the wall of the drum body 43 are equally spaced about the circumference of the drum and serve to hold the web W against the cylindrical surface so that the web W is carried about substantially the entire surface of the drum assembly 14 as indicated in FIGURES 1 and 2. The drum body or core 43 is provided intermediate each pair of the ports 15 with an external, outwardly opening recess 48 (FIGURES 3 and 6) which extends axially and in which there is mounted one of the sealing bars 50 of a sealing bar assembly 16. A co-operating sealing bar 51 is supported on an arm 52 which is substantially longer than the bar 51 and extends at its ends beyond the drum face plates 44 and 44'. The arm 52 is mounted at the end adjacent the back plate 44' on a pivot 53 which is supported in a bracket 54, the latter being bolted or otherwise secured to the back plate 44' at the end of the recess 48. The sealing bar 51 is mounted on the supporting arm 52 by means of a pair of bolts 55 and 55'. Each of the bolts 55 and 55' is slidably mounted in a bore in the arm 52 and each has a compression spring 56 interposed between the outside face of the sealing bar 51 and the inside face of the carrying arm 52 so as to provide a resilient mounting for the bar 51. The pivot 53 (FIGURES 3 to 6) on which the arm 52 is mounted is extended at one side of the bracket 54 and carries a gear 57 which is operated for swinging the arm 52 by a rack 58 supported on a reciprocably mounted carriage forming block 60. The carriage 60 is slidable on a pair of posts 61 and 61' extending between parallel, vertically spaced, lower and upper flanges 62 and 62' on the bracket 54. The flanges 62 and 62' are spaced apart a sufficient distance to permit the carriage 60 to have a predetermined amount of reciprocation sufficient to turn the arm 52 through an arc of approximately 90°. A cam follower roller 63 is mounted on the back face of the carriage 60 and operates in the track 64 of plate or ring cam 65 which is secured on the back side frame plate 26'. At its free end the arm 52 carries a cam follower roller 66 which, in the operative position of the sealing bar 51, passes beneath and is held down by a cam plate 67. The cam plate 67 is mounted on a bracket 68 and the bracket 68 is connected to the front side plate member 40 by means of a pivot 70 which permits the bracket 68 to be swung back out of the way when desired for threading the machine. Sealing bars 50 and 51 are provided with electric heating elements 71 and 72 which are supplied with current through suitable connections with brushes 73 and 74 mounted in extending portions 75 and 76 on the bracket 54 and engaging commutator rings 77 and 78 mounted on the back frame plate 26' and the bracket 54, respectively.

A tube or web tension relaxing device 17 is mounted adjacent each sealing bar member 50 which comprises an elongate plate 80 (FIGURE 6) secured along one margin on a cross shaft 81 which is journaled in the drum face plates 44 and 44' and extends in each of the recesses 48 along the leading side of the sealing member 50. The shaft 81 extends at one end outside the face plate 44 and carries a small lever arm 82 on the free end of which a cam follower roller 83 is mounted and is in engagement with the track forming edge of a cam plate 84 fixed on the side frame member 26. The arm 82 has a torsion spring 85 which holds the cam follower 83 on the cam track. The cam track operates to move the plate 80 outwardly against the web W as the latter is laid onto the surface of the drum just beyond the guide roller 13, as indicated in FIGURE 1, so as to move portions of the web in a radial direction and raise the same outwardly of the drum surface while the web is gripped at a leading portion thereof by the vacuum port 15 on the drum surface and before the next succeeding vacuum port 15 becomes effective so as to insure that the length of the web between the succeeding vacuum ports 15 is greater than the circumferential distance between the ports. The cam plate 84 also operates to drop the plate 80 back into the recess 48 below the circumferential surface during the dwell time of the sealing bar 51 while the transverse seal is being formed. After the seal is formed the plate 80 is moved outwardly by operation of the cam against the web to pull the seal area away from the sealing bar 50 and hold it out of contact with the hot sealing bar while the drum rotates through a cooling area where cooling air is directed onto the web by a horn, which is indicated at 86 in FIGURE 1 and which is connected with a suitable coil air supply.

The pull rolls 12 for advancing the web W, the perforating mechanism 10 and the drum 14 are all driven by connection with a variable speed drive unit indicated at 90 on FIGURE 2. The variable speed unit 90 is connected by a chain and sprocket drive 91 to a main drive shaft 92 which is journaled in the side frame plates 26 and 26'. A gear 93 is carried on the shaft 92 which is in driving engagement with gear 94 on the shaft 30 of the perforating unit 10 and with the gear 95 on the shaft 35 of the upper draw roll 33 so as to drive the perforating unit 10 and the draw rolls 12. The gear 93 also drives the gear 96 on the idler shaft 97 which in turn drives the gear 98 on the one end of the drum shaft 37. The knife carrying roll 27 and the anvil roller 31 of the perforating unit 10 may be connected in driving relation by interengaging gears (not shown). Likewise, the pull rolls 33 and 34 may be connected by interengaging gears (not shown) so that both rolls are driven.

In operating the machine which is described for carrying out the perforating, sealing and cooling operations, the web W is drawn by the pull rolls 12 through the perforating unit 10 for application of successive lines of cross perforations at longitudinally spaced intervals on the web. The perforated web W then passes around the guide roll 13 and into engagement with the surface of the drum 14. As the leading portion of the web W is gripped by a vacuum port 15, the plate assmebly 17 is operated to bow out a portion of the web adjacent the sealing assembly 16 and hold the same in a tent-like condition until the web is gripped at the next succeeding vacuum port 15. As the drum 14 advances through an arc of approximately 90° the plate assembly 17 is pivoted into the recess 48 in the drum and the pivoted sealing bar 51 is swung by operation of the rack and pinion 58, 57 so as to clamp the relaxed web material between the two sealing bars 50 and 51, with the latter being held down by the cam 67 engaging with the cam roller 66. When the cam roller 66 passes from beneath the cam 67 the sealing bar 51 is swung away from the sealing bar 50. The web relaxing plate 80 is then pivoted outwardly so as to lift the sealed tube off of the sealing iron 50, the plate 80 being swung somewhat less in a radial direction than it is initially swung when the web material is gripped on the drum. The seal area is held away from the hot sealing bar 50 while it is advanced approximately 180° through a cooling zone. The web then passes around the guide roller 19 and is wound on the reel 20.

While particular materials and specific details of construction are referred to in describing the method and machine which is illustrated, it will be understood that other materials and equivalent structural arrangements may be resorted to within the spirit of the invention.

I claim:

1. A machine for fabricating bags from a relatively thin plastic tubing in flattened continuous web form, said machine comprising a rotatably mounted web supporting drum having circumferentially spaced means thereon for gripping the tubular web, transverse seal forming means spaced alternately with the web gripping means, means for feeding the tubular web onto the drum, means adjacent the seal forming means for moving a portion of the tubular web laterally of the drum surface while the leading portion of the material is gripped and held on the drum so that the length of the tubular web extending between succeeding web gripping means is greater than the circumferential distance between said web gripping means and means for operating the seal forming means to seal the tubular web while it is relaxed and free of longitudinal tension.

2. A machine for fabricating bags as recited in claim 1, wherein the web gripping means comprises a series of circumferentially spaced vacuum ports and a source of vacuum connected thereto.

3. A machine for fabricating bags as recited in claim 1, and said transverse seal forming means comprising a heat sealing bar seated in a recess in the drum, a cooperating sealing bar mounted on a movable member carried on the drum and means to move said sealing bar toward and from the tubular web.

4. A machine for fabricating bags as recited in claim 1, and said transverse seal forming means comprising a sealing bar seated in a recess in the periphery of the supporting drum and a co-operating sealing bar mounted on a supporting arm, a bracket mounted on the side of the drum, said supporting arm being pivoted on said bracket and a cam operated rack and pinion for swinging the sealing bar arm into and out of seal forming position.

5. A machine for fabricating bags as recited in claim 1, and said transverse seal forming means compirsing a sealing bar fixed in a recess in the drum, a co-operating sealing bar mounted for swinging movement toward and from the fixed sealing bar and a holddown device for holding the movable sealing bar in operative position during a predetermined portion of the rotation of the drum.

6. A machine for fabricating bags from a relatively thin plastic tubing in flattened continuous web form, said machine comprising a rotatably mounted supporting drum having circumferentially spaced, transverse, seal forming members extending parallel with the axis of rotation of the drum and spaced radially from said axis of rotation, each transverse seal forming member having a co-operating movable seal forming member which is disposed on the opposite side of the tubing when operating to transversely seal the tubing, means thereon for gripping the tubing spaced circumferentially of the drum and in alternate relation to the transverse seal forming members, means for guiding the tubing onto the drum, mean sadjacent each seal forming member which is operable to move the tubing in a radial direction relative to the axis of rotation of the drum while a leading portion of the tubing is initially held on the drum by said gripping means so that the portion of the tubing engaged between succeeding gripping means has a greater longitudinal dimension than the circumferential distance between said gripping means, and means for operating the sealing members to transversely seal the tubing while the seal forming area of the tubing is relaxed and free of any tension.

7. A machine as recited in claim 6, and said means for moving the tubing in a radial direction comprising a member mounted adjacent the seal forming member and movable in a radial direction to engage the tubing and force a portion thereof out of the normal path of advance of said tubing.

8. A machine as recited in claim 6, and said means for moving the tubing in a radial direction comprising a bar forming member swingably mounted on an axis parallel with the axis of rotation of the drum and means for controlling the swinging movement of said bar forming member.

9. A machine as recited in claim 8, and cam means for operating said bar forming member during predetermined rotation of said drum so as to engage the tubing and move the same relative to the transverse seal forming members.

10. A machine as recited in claim 6, and a supporting arm for said movable seal forming member which is mounted for swinging movement on an axis which is normal to the axis of rotation of said drum, and means for swinging said supporting arm to bring the seal forming member thereon into and out of oppositely disposed, seal forming relation with the co-operating seal forming member on the drum.

11. A machine as recited in claim 10, and said means for swinging said supporting arm comprising a cam controlled rack and pinion.

12. A machine as recited in claim 10, and said movable seal forming member being resiliently mounted on said supporting arm.

13. A machine as recited in claim 6, and said transverse seal forming members comprising electrically heated, relatively narrow sealing bar members.

14. A machine as recited in claim 6, and means for engaging the movable seal forming member and holding said seal forming member in operative seal forming position while the drum rotates through a predetermined arc.

15. A machine as recited in claim 10, and a holddown means for engaging the free end of said supporting arm so as to hold the seal forming member in predetermined position during partial rotation of said drum.

16. A machine for fabricating bags from a relatively thin plastic tubing in flattened continuous web form, said machine comprising a rotatably mounted web supporting drum having circumferentially spaced means thereon for gripping the web so as to hold it on the surface of the drum, transverse seal forming means spaced alternately with the web gripping means, means for perforating the web on transverse lines at longitudinally spaced intervals corresponding to the length desired for forming the bags and for feeding the web onto the drum surface, interconnecting means for driving the drum and the web perforating and feeding means so as to feed the web onto the drum with the lines of perforations adjacent said transverse seal forming means, means adjacent the seal forming means for moving a portion of the web laterally of the drum surface while the leading portion thereof is gripped and held on the drum so that the length of the web extending between succeeding web gripping means is greater than the circumferential distance between said web gripping means and means for operating the seal forming means to seal the web on successive transverse lines adjacent the perforation lines while it is relaxed and free of longitudinal tension.

References Cited

UNITED STATES PATENTS

| | | | |
|---|---|---|---|
| 2,729,270 | 1/1956 | Prenveille et al. | 156—243 |
| 2,882,956 | 4/1959 | Weist | 156—353 |
| 2,742,080 | 4/1956 | Cloud | 156—549 |
| 2,936,815 | 5/1960 | Schjeldahl et al. | 156—543 |
| 3,146,147 | 8/1964 | Naser | 156—353 |
| 3,419,453 | 12/1968 | Levenson | 156—513 |
| 3,454,447 | 7/1969 | Corbett et al. | 156—353 |

REUBEN EPSTEIN, Primary Examiner

U.S. Cl. X.R.

156—285, 311, 350, 499, 513, 543, 583